Patented Dec. 13, 1949

2,491,436

UNITED STATES PATENT OFFICE 2,491,436

DRILLING MUD

William E. Barnes, Beaumont, Tex., assignor to Sun Oil Company, Philadelphia, Pa., a corporation of New Jersey No Drawing. Application July 11, 1947,
Serial No. 760,507

17 Claims. (Cl. 252—8.5)

This invention relates to an improved aqueous drilling fluid for use in the rotary drilling of wells and to a method of treating drilling fluid to improve its characteristics.

It is customary in drilling wells by the rotary method to circulate a drilling fluid into and out of the borehole continuously during the drilling operation. The drilling fluid or mud is pumped from a mud pit into the drill pipe and passes downwardly to the bottom of the borehole, whence it issues into, and flows upwardly through, the annular space between the drill pipe and the borehole wall and thence flows from the well and is returned through a mud ditch to the mud pit. The drilling mud is designed to perform several important functions. It serves to lubricate and cool the drill bit and to carry the cuttings from the borehole. It also provides sufficient hydrostatic pressure against the formations penetrated during drilling to prevent caving of the borehole wall and to prevent intrusion into the borehole of gaseous or liquid fluids encountered in the formations. The drilling mud also is designed to "plaster out" or form a thin filter cake on the borehole wall to seal off the borehole and thereby prevent loss of water to the formations penetrated.

The usual drilling mud is prepared by dispersing a hydratable sodium clay such as sodium bentonite in water and, if desired, suspending weighting materials such as barytes therein to increase the weight of the mud to the desired value.

In order that the drilling mud will perform its several functions properly, it is essential that it have certain properties or characteristics and that these be maintained in proper balance throughout the drilling operation. One important property required of the drilling mud is thixotropy or the ability to form a gel upon standing and yet readily revert to the fluid state upon agitation. This property is important in preventing the weighting materials from settling out in the mud pits and also in preventing cuttings from settling to the bottom of the borehole whenever the drilling operation is suspended for any reason and possibly causing the drill pipe to stick. The gel rate and gel strength of the mud should be sufficient to prevent settlement of the cuttings within the borehole and also to prevent settlement of weighting materials in the mud pits but not so high as to cause excessive gelation in the mud ditch and mud pits. Also, if gelation is excessive, it may be difficult or impossible to run an instrument down the well in case it is desired to log the well or determine its inclination or the like. In such case it may also be difficult to resume circulation of the drilling mud.

Another important property is the viscosity of the mud. The viscosity should be sufficiently low so that the mud is readily pumpable and so that cuttings and sand will settle out in the settling pits. If the viscosity is too low, however, the mud may be easily lost into porous formations traversed by the borehole and the larger drill cuttings may accumulate in the borehole rather than being properly carried out by the circulating fluid. In addition to its adverse effect on pumpability and sed'mentation, high viscosity may tend to cause the mud to become gas cut through failure to properly release gas at the surface.

Still another important property of the drilling mud is its filtration characteristics or ability to "plaster out" on the borehole wall and form a filter cake with a minimum of water loss. It is desirable that the water loss be as low as possible. If the water loss is high, a thick filter cake will be formed on the wall of the borehole and may cause sticking of the drill pipe. Certain shales, often referred to as heaving shales, have a tendency to swell when wet with water and to slough off in the borehole. This may result in closure of the hole and sticking of the drill pipe therein. A low water loss mud will overcome this difficulty by reducing the tendency of the shale to swell and slough off.

It is well known that one or more of the aforesaid properties or characteristics of the drilling mud is apt to become adversely affected during the course of drilling due to contamination of the mud by salts or by cement. The mud may become contaminated by salt in drilling through rock salt or by intrusion of salt water from the formations penetrated. Certain calcium salts may be encountered, for example in drilling through gypsum or anhydrite, which will have an adverse effect upon the properties of the mud by causing flocculation of the sodium bentonite clay. Contamination with cement will occur whenever it is necessary to drill out a cement plug after a sealing operation. The effect of these various types of contamination generally is to cause the viscosity, gel strength and water loss of the drilling mud to increase and often to such extent that the mud will become unsuitable for use. In such cases, various methods of treating the mud to restore its desired properties have been devised. Among the most widely used methods of reconditioning the drilling mud are included treatment with complex phosphate compounds, such as sodium tetraphosphate, tetrasodium pyrophosphate and sodium hexametaphosphate. A disadvantage in employing this type of treatment arises, however, due to the fact that these complex phosphates are unstable at high temperature and accordingly may decompose at the temperatures prevalent in the well, particularly if the well is a relatively deep one. In many cases, one circulation of the phosphate treated mud through the well will effect decomposition of the complex phosphate compound and cause its effectiveness to be lost. Thus, continuous addition of the phosphate compound will be required to maintain the desired drilling mud qualities.

The present invention provides an improved method of treating drilling mud to reduce its viscosity and decrease its gel strength and water loss characteristics. Not only does the resultant drilling mud composition possess enhanced properties but also the qualities of the mud are not subject to rapid deterioration when the mud is used at high temperature. The method is useful in reconditioning a drilling mud which has become contaminated with salt or cement or with other compounds encountered in drilling which have an adverse effect on a sodium bentonite mud. The invention is also useful in the preparation of a suitable drilling mud composition when it is necessary to use salt water in making up the mud as when only salt water is available.

The method of treating mud according to the present invention in general comprises treating the mud with a lignosulfonate and also treating it with an alkaline earth metal compound to convert the clay present in the mud from the usual sodium form into an alkaline earth metal clay, such as a calcium clay, by base exchange reaction. The lignosulfonate may be either an alkali metal lignosulfonate or an alkaline earth metal lignosulfonate or a mixture of the same. The treatment may be carried out first by adding the lignosulfonate and also, either before or after such addition, by regulating the pH value of the mud to above 8 and preferably above 10. The regulation of pH is desirable, if necessary, in order to prevent an unduly high viscosity of the mixture upon addition of the alkaline earth metal compound, and it may be done by the addition of an alkali metal hydroxide such as caustic soda if the original pH value of the mud is too low. Then, the alkaline earth metal compound may be added to the mixture to effect conversion of the sodium clay to calcium clay by base exchange reaction. The resulting mud composition should have a pH value within the range of 8-13.5 and preferably within the range of 10-13.

In a preferred form of the invention, calcium ligno-sulfonate and lime are used as the treating materials. Calcium lignosulfonate is derived as a by-product of paper manufacture from waste sulfite liquor obtained from the Sulfite process and is available commercially in large quantities at low cost. It is also variously referred to in the art as calcium lignone sulfonate or calcium lignin sulfonate. A method used commercially for the recovery of the calcium lignosulfonate, which method is generally referred to as the Howard process, is described in Reissue Patent No. 18,268, dated December 1, 1931, and also in an article appearing in "Industrial and Engineering Chemistry," volume 31, No. 11, November, 1939, pages 1331–1335. The commercial product is obtained in the form of an amorphous solid composed mainly of calcium lignosulfonate. It also usually contains a minor amount of carbohydrates derived from the waste sulfite liquor. The drilling mud to be treated comprising a hydratable sodium clay such as sodium bentonite preferably is first treated by adding thereto calcium lignosulfonate and also caustic soda, if necessary, in order to regulate the pH value to above 8 and preferably to above 10. The amount of calcium lignosulfonate necessary to give the desired improvement in properties will vary but generally will be within the range of 1–10 lbs./bbl. of mud. Lime is then added to the mixture to convert the sodium bentonite substantially to calcium bentonite. The amount of lime required will vary dependent upon the amount of sodium bentonite and other sodium compounds present in the mixture but will generally also be within the range of 1–10 lbs./bbl. and often will be approximately equal to the amount of calcium lignosulfonate used. These materials have been found to be very effective in producing a drilling mud having improved characteristics with respect to viscosity, gel formation and filtration.

It is preferred in practicing the invention to employ an amount of lime in excess of that required to convert the sodium bentonite to the calcium form so that the treated mud will contain excess calcium hydroxide. This is advantageous in that when the mud is used in drilling through a sodium clay such as shale or bentonite, the free calcium hydroxide effects a conversion of the surface of the clay particles to the calcium form and thereby inhibits dispersion of the drilled clay in the mud. This prevents the viscosity of the mud from unduly increasing due to such dispersion. It should be understood, however, that it is not essential that the mud contain free calcium hydroxide, since the desired pH of the mud may be obtained by adding caustic soda or other hydroxide compound; but the presence of free calcium hydroxide is advantageous in imparting to the mud the further improvement above described.

The preferred drilling mud composition according to the invention therefore comprises an aqueous mixture containing calcium bentonite clay, calcium liknosulfonate and excess lime. The mixture preferably has a pH value of 10-13. It may also contain a weighting material such as barytes in amount sufficient to form a mud having the desired weight. As previously described, however, the invention is not limited to these specific compounds and any of the other alkaline earth metals may be used in place of the calcium if desired.

Standard methods for determining the viscosity, gel strengths and filtration characteristics of drilling muds are widely used in the art and such methods have been described in a publication entitled A. P. I. Code 29, "Recommended Practice on Standard Field Procedure for Testing Drilling Fluids," 2nd edition (1942). The data given in the examples hereinafter described were obtained by employing these standard test methods. While the test results that would be indicative of a suitable drilling mud are subject to considerable variation dependent upon the particular conditions under which the drilling mud is to be used, for purpose of interpreting results it may be considered that as a general rule the test properties of the mud should fall within the following approximate ranges:

|  | Maximum Variation | Preferred Range |
|---|---|---|
| Stormer viscosity, cp | 10 to 85 | 20 to 40 |
| Initial gel strength, gms | 0 to 50 | 0 to 5 |
| 10 min. gel strength, gms | 0 to 200 | 15 to 50 |

In addition to these, it is desirable that the water loss according to the standard test be below 10 c. c. and preferably as low as possible.

The following examples, in which the lignosulfonate materials employed were commercial grades of products derived from waste sulfite liquor by employing the aforesaid Howard process, are illustrative:

Example 1

A drilling mud which had been prepared from sodium bentonite was treated with lime in the proportion of 6 lbs./bbl. and then with 8 lbs./bbl. of sodium lignosulfonate. The following is a comparison of tests results on the mud before and after each treatment:

|  | Original Mud | After Treatment |
|---|---|---|
| Water loss, c. c. | 9.5 | 4 |
| Viscosity, cp | 27 | 16.5 |
| Initial gel strength, gms | 5 | 0 |
| 10 min. gel strength, gms | 70 | 15 |

Example 2

The original mud shown in Example 1 was mixed with sodium chloride in the proportion of 3.5 lbs./bbl., thereby causing an increase in water loss, viscosity and gel strength. The mixture was then treated with 6 lbs./bbl. of lime and 8 lbs./bbl. of sodium lignosulfonate and the following results were obtained:

|  | Mud + 3.5 lbs./bbl. of Salt | After Treatment |
|---|---|---|
| Water loss, c. c. | 14.5 | 5 |
| Viscosity, cp | 76 | 17 |
| Initial gel strength, gms | 170 | 0 |
| 10 min. gel strength, gms | 200 | 120 |

Example 3

Another run was made similar to Example 2 except that the salt was added in the proportion of 7 lbs./bbl., with results as follows:

|  | Mud + 7 lbs./bbl. of Salt | After Treatment |
|---|---|---|
| Water loss, c. c. | 30 | 6 |
| Viscosity, cp | 68 | 39 |
| Initial gel strength, gms | 120 | 5 |
| 10 min. gel strength, gms | 200 | 130 |

Example 4

Another experiment was carried out similarly to Example 2 except that 10.5 lbs./bbl. of salt was added and the sodium lignosulfonate was added in the proportion of 10 lbs./bbl.

|  | Mud+10.5 lbs./bbl. of Salt | After Treatment |
|---|---|---|
| Water loss, c. c. | 33 | 4.6 |
| Viscosity, cp | 64 | 15 |
| Initial gel strength, gms | 120 | 0 |
| 10 min. gel strength, gms | 195 | 100 |

Example 5

Another sodium bentonite mud was prepared and was then treated in accordance with the invention by mixing it with 1.5 lbs./bbl. of lime and 4 lbs./bbl. of magnesium lignosulfonate, with results as follows:

|  | Original Mud | After Treatment |
|---|---|---|
| Water loss, c. c. | 20 | 17 |
| Viscosity, cp | 12 | 3.5 |
| Initial gel strength, gms | 10 | 0 |
| 10 min. gel strength, gms | 80 | 5 |

While the viscosity of the mud was low originally in this case so that in actual practice reduction of viscosity would not be desirable, the results indicate that the magnesium lignosulfonate could be effectively used if desired in cases of high initial viscosity of the mud.

Example 6

A drilling mud which had been obtained from an actual well drilling operation, during the course of which it had been treated with sodium acid pyrophosphate to reduce its viscosity, was used in the present example. One batch (designated A) of this mud was treated with 4 lbs./bbl. of lime and 8 lbs./bbl. of calcium lignosulfonate. Another batch (designated B) was treated with 1 lb./bbl. of caustic soda and 4 lbs./bbl. of calcium lignosulfonate. Results were as follows:

|  | Original Used Mud | After Treatment | |
|---|---|---|---|
|  |  | Batch A | Batch B |
| Water loss, c. c. | 12 | 4 | 6 |
| Viscosity, cp | 52 | 22 | 23 |
| Initial gel strength, gms | 50 | 2 | 2 |
| 10 min. gel strength, gms | 125 | 50 | 50 |

Example 7

Another set of runs was made with a further portion of the original used mud described in Example 6 and treatments were carried out in the same manner. Before treatment, however, there was added to the mud 3.5 lbs./bbl. of salt.

|  | Mud+3.5 lbs./bbl. of Salt | After Treatment | |
|---|---|---|---|
|  |  | Batch A | Batch B |
| Water loss, c. c. | 16 | 5 | 13 |
| Viscosity, cp | (¹) | 52 | 64 |
| Initial gel strength, gms | 550 | 20 | 60 |
| 10 min. gel strength, gms | 700 | 120 | 240 |

¹ Solidified.

Example 8

Still another set of runs was made with the original used mud described in Example 6 and employing the same treatments, but in this case 3.5 lbs./bbl. of cement was added to the mud before treatment.

|  | Mud+3.5 lbs./bbl. of Cement | After Treatment | |
|---|---|---|---|
|  |  | Batch A | Batch B |
| Water loss, c. c. | 13 | 6 | 7 |
| Viscosity, cp | (¹) | 35 | 40 |
| Initial gel strength, gms | 250 | 12 | 75 |
| 10 min. gel strength, gms | 450 | 200 | 170 |

¹ Solidified.

Example 9

The present example illustrates another advantage of the present invention, namely, the preparation of an extremely heavy drilling mud (e. g. one weighing about 20 lbs./gal.) without exceeding the maximum desirable viscosity. A natural mud was used as base stock and to this was added barytes in incremental amounts until the viscosity of the mixture exceeded 85 centipoises. In one run the mud was treated in known manner with quebracho and caustic soda to reduce the viscosity and the weighting material was added until this treatment was no longer effective to keep the viscosity below 85. The maximum weight of mud that could be obtained in this manner was about 18.6 lbs./gal. In another run a similar procedure was followed except that the mud was treated with sodium acid pyrophosphate. The maximum weight of mud obtainable in this manner before exceeding a viscosity of 85 was about 18.9 lbs./gal. In a third run, treatment was carried out in accordance with the present invention employing lime and calcium lignosulfonate. It was found that a mud having a weight of about 20.1 lbs./gal. could be prepared before a viscosity of 85 was exceeded.

The above specific examples are merely illustrative of the invention and numerous modifications will be apparent to those skilled in the art. It should be understood that it is not essential that the treating materials be added to the mud in any particular order and that the hereinabove described methods are merely those preferred in practicing the invention.

Having described my invention, what I claim and desire to protect by Letters Patent is:

1. An aqueous drilling mud comprising a hydratable alkaline earth metal clay dispersed in water and at least 1 lb./bbl. of a viscosity-reducing material derived from waste sulfite liquor as an amorphous solid and composed mainly of lignosulfonate of the group consisting of alkali metal lignosulfonates and alkaline earth metal lignosulfonates, said material having been obtained by a process comprising precipitating lignosulfonic components from the waste sulfite liquor in the form of a basic alkaline earth metal lignosulfonate by means of a treatment with an alkaline earth metal hydroxide, said material being present in sufficient amount in the drilling mud to substantially reduce the viscosity.

2. A drilling mud according to claim 1 having a pH value of 10–13.

3. An aqueous drilling mud comprising a hydratable calcium clay dispersed in water and at least 1 lb./bbl. of a viscosity-reducing material derived from waste sulfite liquor as an amorphous solid and composed mainly of lignosulfonate of the group consisting of alkali metal lignosulfonates and alkaline earth metal lignosulfonates, said material having been obtained by a process comprising precipitating lignosulfonic components from the waste sulfite liquor in the form of a basic alkaline earth metal lignosulfonate by means of a treatment with an alkaline earth metal hydroxide, said material being present in sufficient amount in the drilling mud to substantially reduce the viscosity.

4. A drilling mud according to claim 3 having a pH value of 10–13.

5. An aqueous drilling mud comprising calcium bentonite dispersed in water and at least 1 lb./bbl. of a viscosity-reducing material derived from waste sulfite liquor as an amorphous solid and composed mainly of calcium lignosulfonate, said material having been obtained by a process comprising precipitating lignosulfonic components from the waste sulfite liquor in the form of a basic alkaline earth metal lignosulfonate by means of a treatment with an alkaline earth metal hydroxide, said material being present in sufficient amount in the drilling mud to substantially reduce the viscosity.

6. A drilling mud according to claim 5 having a pH value of 10–13.

7. A drilling mud according to claim 5 containing 1–10 lbs./bbl. of the said material.

8. An aqueous drilling mud comprising calcium bentonite dispersed in water, free calcium hydroxide and at least 1 lb./bbl. of a viscosity-reducing material derived from waste sulfite liquor as an amorphous solid and composed mainly of calcium lignosulfonate, said material having been obtained by a process comprising precipitating lignosulfonic components from the waste sulfite liquor in the form of a basic alkaline earth metal lignosulfonate by means of a treatment with an alkaline earth metal hydroxide, said material being present in sufficient amount in the drilling mud to substantially reduce the viscosity.

9. A drilling mud according to claim 8 containing 1–10 lbs./bbl. of the said material and having a pH value of 10–13.

10. Method of treating an aqueous drilling mud comprising an alkali metal clay dispersed in water which comprises regulating the pH value to above 8 and mixing with the mud an alkaline earth metal compound in amount at least sufficient to convert the alkali metal clay substantially to an alkaline earth metal clay and at least 1 lb./bbl. of a viscosity-reducing material derived from waste sulfite liquor as an amorphous solid and composed mainly of lignosulfonate of the group consisting of alkali metal lignosulfonates and alkaline earth metal lignosulfonates, said material having been obtained by a process comprising precipitating lignosulfonic components from the waste sulfite liquor in the form of a basic alkaline earth metal lignosulfonate by means of a treatment with an alkaline earth metal hydroxide, said material being added in amount sufficient to substantially reduce the viscosity.

11. Method according to claim 10 wherein the pH value is regulated to above 10.

12. Method according to claim 10 wherein said alkaline earth metal compound is lime and the said material is composed mainly of calcium lignosulfonate.

13. Method according to claim 12 wherein the lime and the said material are each added to the mud in a proportion of 1–10 lbs./bbl.

14. Method of treating an aqueous drilling mud comprising an alkali metal clay dispersed in water to reduce its viscosity and gel strength and improve its sealing characteristics which comprises regulating the pH value to above 8 and mixing with the mud 1–10 lbs./bbl. of lime and 1–10 lbs./bbl. of a material derived from waste sulfite liquor as an amorphous solid and composed mainly of calcium lignosulfonate, said material having been obtained by a process comprising precipitating lignosulfonic components from the waste sulfite liquor in the form of a basic alkaline earth metal lignosulfonate by means of a treatment with an alkaline earth metal hydroxide.

15. Method according to claim 14 wherein the pH value is regulated to above 10.

16. In the drilling of a well by the rotary method wherein a drilling mud comprising an alkaline earth metal clay dispersed in water is circulated through the borehole during the drilling operation, the steps of treating the drilling mud to control its viscosity which comprises mixing with the mud at least 1 lb./bbl. of a viscosity-reducing material derived from waste sulfite liquor as an amorphous solid and composed mainly of lignosulfonate of the group consisting of alkali metal lignosulfonates and alkaline earth metal lignosulfonates, said material having been obtained by a process comprising precipitating lignosulfonic components from the waste sulfite liquor in the form of a basic alkaline earth metal lignosulfonate by means of a treatment with an alkaline earth metal hydroxide, said material being added in amount sufficient to substantially reduce the viscosity, and maintaining the pH value of the mud above 8 during the drilling operation.

17. Method according to claim 16 wherein the said material is composed mainly of calcium lignosulfonate.

WILLIAM E. BARNES.

REFERENCES CITED

The following references are of record in the file of this patent:

UNITED STATES PATENTS

| Number | Name | Date |
|---|---|---|
| 1,847,864 | Cross | Mar. 1, 1932 |
| 1,999,766 | Lawton et al. | Apr. 30, 1935 |
| 2,109,858 | Cannon | Mar. 1, 1938 |
| 2,213,039 | David | Aug. 27, 1940 |
| 2,331,049 | Schindler | Oct. 5, 1943 |
| 2,375,616 | Booth | May 8, 1945 |

OTHER REFERENCES

Lawton et al.: Chemical Treatment of Rotary Drilling Fluids, article in Physics, vol. 2, pp. 374 and 375, May 1932.

Wallace: Drilling Mud Control in the Gulf Coast Area, article in The Petroleum Engineer, January 1946, pp. 196, 198, 200 and 202.

Cannon: Developments in Drilling Mud Control, article in The Oil and Gas Journal, May 3, 1948, p. 103.